(12) United States Patent
Anderson (10) Patent No.: US 9,536,352 B2
(45) Date of Patent: Jan. 3, 2017

(54) IMITATING PHYSICAL SUBJECTS IN PHOTOS AND VIDEOS WITH AUGMENTED REALITY VIRTUAL OBJECTS

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/227,752

(22) Filed: Mar. 27, 2014

(65) Prior Publication Data

US 2015/0279101 A1    Oct. 1, 2015

(51) Int. Cl.
| | |
|---|---|
| *G09G 5/00* | (2006.01) |
| *G09G 5/377* | (2006.01) |
| *G06T 19/00* | (2011.01) |
| *G06F 3/01* | (2006.01) |
| *G06F 17/30* | (2006.01) |
| *G06K 17/00* | (2006.01) |

(52) U.S. Cl.
CPC ............. *G06T 19/006* (2013.01); *G06F 3/011* (2013.01); *G06F 3/013* (2013.01); *G06F 3/016* (2013.01); *G06F 17/30873* (2013.01); *G06K 17/0016* (2013.01); *G09G 5/377* (2013.01); *A63F 2300/695* (2013.01); *A63F 2300/8082* (2013.01); *G09G 2340/12* (2013.01); *G09G 2340/125* (2013.01); *G09G 2354/00* (2013.01)

(58) Field of Classification Search
CPC .... G09G 5/377; G06F 17/30873; G06F 3/013; G06F 3/016; A63F 2300/8082; A63F 2300/695; G06T 19/006; G06K 17/0016
USPC .................................................. 345/419, 633
See application file for complete search history.

(56) References Cited

U.S. PATENT DOCUMENTS

| | | | | |
|---|---|---|---|---|
| 2011/0214071 A1* | 9/2011 | Zyda et al. | .................... | 715/753 |
| 2011/0316880 A1* | 12/2011 | Ojala | .................... | G06T 19/006 |
| | | | | 345/633 |
| 2013/0044128 A1* | 2/2013 | Liu | .......................... | G09G 5/00 |
| | | | | 345/633 |
| 2013/0113789 A1* | 5/2013 | Suzuki | ......................... | 345/419 |
| 2013/0117377 A1* | 5/2013 | Miller | ........................... | 709/205 |
| 2013/0182012 A1* | 7/2013 | Kim et al. | .................... | 345/633 |
| 2013/0335446 A1* | 12/2013 | Piippo | ................. | G06F 3/04815 |
| | | | | 345/633 |

(Continued)

*Primary Examiner* — Jin-Cheng Wang
(74) *Attorney, Agent, or Firm* — Barnes & Thornburg LLP (57) ABSTRACT

Technologies for rendering augmented reality virtual objects include an augmented reality device to capture an image and recognize subjects within the image. Subjects may include persons or objects, such as accessories. The augmented reality device determines a context associated with the subjects of the image and selects one or more virtual objects based on the context. The identified context may include an activity or theme associated with the subject or accessories included in the image. Virtual objects may include accessories and clothing for virtual characters. The augmented reality device may select virtual objects that are similar to identified subjects and accessories, or that are associated with an identified activity or theme of the subject. The augmented reality device applies the virtual objects to a virtual character and renders an augmented reality scene based on the captured image that includes the virtual character. Other embodiments are described and claimed.

18 Claims, 4 Drawing Sheets

(56) References Cited

U.S. PATENT DOCUMENTS

2014/0198096 A1* 7/2014 Mitchell .................. 345/419
2014/0247278 A1* 9/2014 Samara et al. ............ 345/633
2015/0091941 A1* 4/2015 Das ..................... A63F 13/23
                                                                                  3/23

* cited by examiner

IMITATING PHYSICAL SUBJECTS IN PHOTOS AND VIDEOS WITH AUGMENTED REALITY VIRTUAL OBJECTS

BACKGROUND

Augmented reality systems project virtual characters and objects into physical locations, allowing for immersive experiences and novel interaction models. In particular, in some augmented reality systems, virtual characters or objects may be inserted into real-world images, for example by overlaying a captured image or video stream with a two- or three-dimensional animated rendering of the virtual character. In some systems, a physical object recognized in the captured image may be replaced by a virtual object associated with that physical object. For example, recognized vehicles in the captured image may be recognized and replaced with animated vehicles (e.g., military vehicles, cartoon vehicles, etc.).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
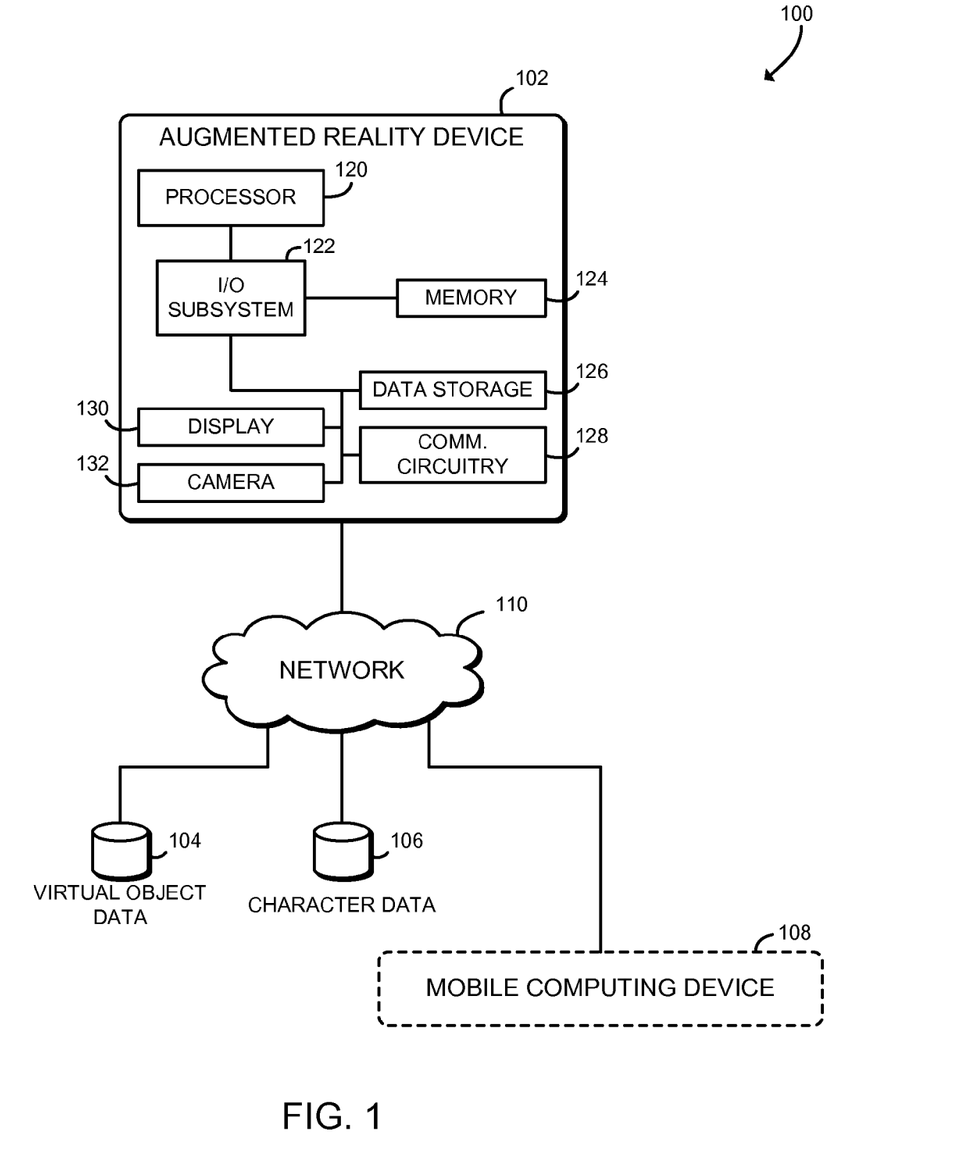
FIG. 1 is a simplified block diagram of at least one embodiment of a system for imitating physical subjects with augmented reality virtual objects.

Referring now to FIG. 1, in the illustrative embodiment, a system 100 for rendering augmented reality virtual objects includes an augmented reality device 102, which may be in communication over a network 110 with distributed virtual object data 104 and/or character data 106. In use, as discussed in more detail below, the augmented reality device 102 captures an image and identifies subjects within the captured image, including persons and objects. The augmented reality device 102 determines the context of the subjects within the image by comparing the recognized subjects with a catalog of virtual object data 104. The virtual object data 104 identifies features, activities, themes, or other metadata associated with particular virtual objects. Additionally or alternatively, in some embodiments, the augmented reality device 102 may receive context data from one or more mobile computing devices 108 associated with a subject of the image. After determining the context of recognized subjects, the augmented reality device 102 searches the virtual object data 104 based on the context to select one or more virtual objects, such as virtual accessories, having similar context. The augmented reality device 102 applies the virtual objects to a virtual character, and then renders an augmented reality scene including the applied virtual objects and the virtual character using the character data 106. Alternatively, the augmented reality device 102 may apply the virtual objects to an image of an actual person or object in the rendering. In either case, the augmented reality device 102 may render objects and/or characters that tend to imitate the context of subjects within the image. Augmented reality scenes that imitate features of the captured image may increase interactivity of augmented reality systems, and may make augmented reality more compelling for users.

The augmented reality device 102 may be embodied as any type of device capable of rendering one or more augmented reality characters and otherwise performing the functions described herein, including, without limitation, a smartphone, a cellular telephone, a handset, a computer, a tablet computer, a laptop computer, a notebook computer, a messaging device, a digital television, a desktop computer, a gaming console, a smart appliance, a set-top box, a network appliance, a web appliance, a distributed computing system, a multiprocessor system, a processor-based system, and/or a consumer electronic device. As shown in FIG. 1, the augmented reality device 102 includes a processor 120, an input/output subsystem 122, a memory 124, a data storage device 126, and communication circuitry 128. Of course, the augmented reality device 102 may include other or additional components, such as those commonly found in a smartphone (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the augmented reality device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the augmented reality device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the augmented reality device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may permanently or temporarily store data associated with captured images as well as data associated with virtual characters or other virtual objects, including in some embodiments part or all of the virtual object data 104 and/or the character data 106.

The communication circuitry 128 of the augmented reality device 102 may be embodied as any communication circuit, device, or collection thereof, capable of enabling communications between the augmented reality device 102 and other remote devices over the network 110. The communication circuitry 128 may be configured to use any one or more communication technology (e.g., wireless or wired communications) and associated protocols (e.g., 3 G, LTE, Bluetooth®, Wi-Fi®, WiMAX, etc.) to effect such communication.

In the illustrative embodiment, the augmented reality device 102 further includes a display 130 and a camera 132. The display 130 of the augmented reality device 102 may be embodied as any type of display capable of displaying digital information such as a liquid crystal display (LCD), a light emitting diode (LED), a plasma display, a cathode ray tube (CRT), or other type of display device. In some embodiments, the display 130 may be coupled to a touch screen to allow user interaction with the augmented reality device 102. The camera 132 may be embodied as a digital camera or other digital imaging device integrated with the augmented reality device 102 or otherwise communicatively coupled thereto. The camera 132 includes an electronic image sensor, such as an active-pixel sensor (APS), e.g., a complementary metal-oxide-semiconductor (CMOS) sensor, or a charge-coupled device (CCD). The camera 132 may be used to capture images of the environment of the augmented reality device 102 including, in some embodiments, capturing still images or video images.

The virtual object data 104 and the character data 106 may each be embodied as any network-accessible data storage, including without limitation as a database, a file server, network attached storage, or a storage area network. The virtual object data 104 and the character data 106 are illustrated as networked data accessible by the augmented reality device 102; however, in other embodiments the virtual object data 104 and/or the character data 106 may be in any location accessible to the augmented reality device 102, including in local storage or a local file server.

The mobile computing device 108 may be embodied as any type of mobile computing device capable of performing the functions described herein including, without limitation, a smartphone, a cellular telephone, a handset, a wearable computing device, an in-vehicle infotainment device, a computer, a tablet computer, a laptop computer, a notebook computer, a messaging device, a network appliance, a web appliance, a distributed computing system, a multiprocessor system, a processor-based system, and/or a consumer electronic device. As such, the mobile computing device 108 may include components and features similar to the augmented reality device 102, such as a processor, I/O subsystem, memory, data storage, communication circuitry, and various peripheral devices, which are not illustrated in FIG. 1 for clarity of the present description.

As discussed in more detail below, the augmented reality device 102 may be configured to transmit and receive data with the mobile computing device 108 and/or other remote devices over the network 110. The network 110 may be embodied as any number of various wired and/or wireless networks. For example, the network 110 may be embodied as, or otherwise include, a wired or wireless local area network (LAN), a wired or wireless wide area network (WAN), a cellular network, and/or a publicly-accessible, global network such as the Internet. As such, the network 110 may include any number of additional devices, such as additional computers, routers, and switches, to facilitate communications among the devices of the system 100.

Figure 2:
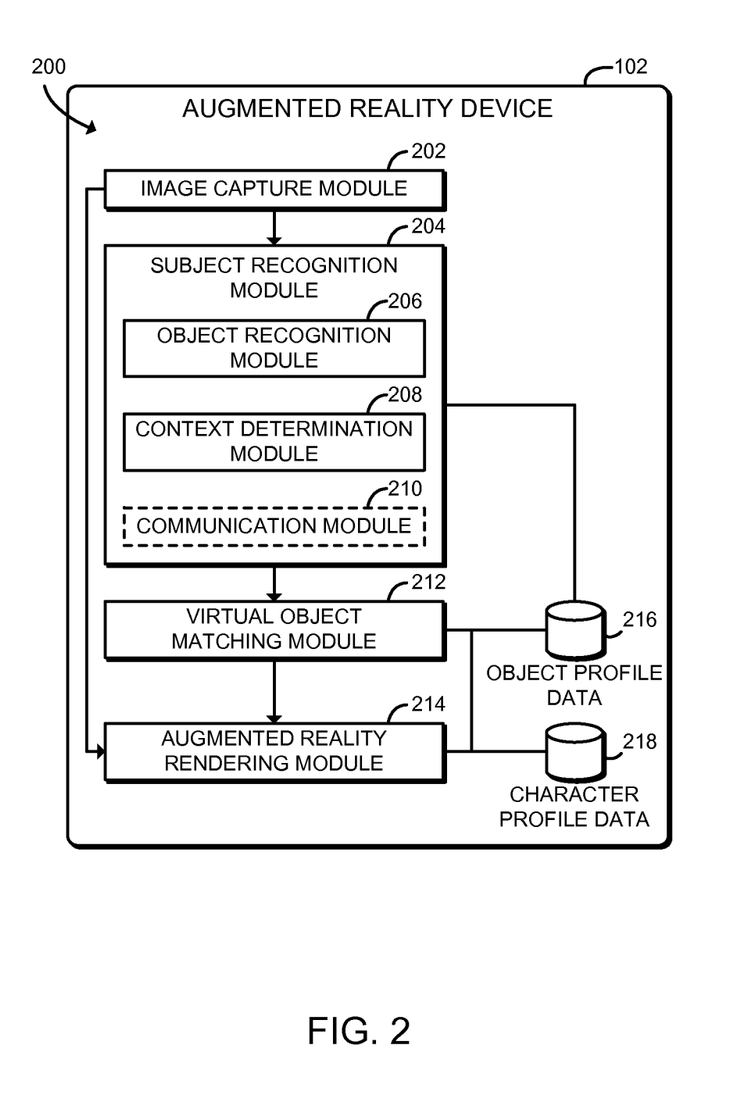
FIG. 2 is a simplified block diagram of at least one embodiment of an environment that may be established by an augmented reality device of FIG. 1.

Referring now to FIG. 2, in the illustrative embodiment, the augmented reality device 102 establishes an environment 200 during operation. The illustrative environment 200 includes an image capture module 202, a subject recognition module 204, a virtual object matching module 212, and an augmented reality rendering module 214. The environment 200 also includes object profile data 216, including data relating to the virtual objects that may be incorporated in an augmented reality scene, and character profile data 218, related to virtual characters that may be incorporated in the augmented reality scene. The various modules of the environment 200 may be embodied as hardware, firmware, software, or a combination thereof.

The image capture module 202 is configured to capture a still or video image using the camera 132. Image capture may be initialized in response to user input to the augmented reality device 102, for example by selecting an image capture function or application. The captured image is analyzed and processed by the subject recognition module 204 and is also used by the augmented reality rendering module 214 to render the augmented reality scene, as further described below.

The subject recognition module 204 is configured to analyze the captured image to recognize subjects within the image and to determine a context associated with the subjects. The recognized subjects may include faces, persons, and/or objects within the image. The subject recognition module 204 may determine that certain recognized objects are primary subjects of the image (e.g., persons or prominent objects), and that other recognized objects are accessories (e.g., clothing or background objects). The subject recognition module 204 may determine the context of the recognized objects by comparing the recognized objects to the object profile data 216. Additionally, or alternatively, in some embodiments the subject recognition module 204 may receive context data from one or more remote mobile computing devices 108 using the communication circuitry 128. In some embodiments, those functions may be performed by sub-modules, for example by an object recognition module 206, a context determination module 208, and/or a communication module 210.

The virtual object matching module 212 is configured to select one or more virtual objects based on the context of the subjects recognized within the captured image. The virtual object matching module 212 may select virtual objects that are similar to the subjects or accessories identified in the image, including virtual objects of similar type or with similar appearance or other features. Additionally or alternatively, the virtual object matching module 212 may select virtual objects associated with a similar activity or theme as the subjects or accessories identified in the image. The virtual object matching module 212 may use the object profile data 216 to select the virtual objects. The virtual object matching module 212 may also use the character profile data 218 to select the virtual objects, for example, selecting from virtual objects that may be added or composed with a virtual character.

The augmented reality rendering module 214 is configured to apply the selected virtual objects to one or more virtual reality characters and then render an augmented reality scene. The augmented reality scene is based on the original captured image, and includes the virtual character and any virtual objects that have been applied. The augmented reality rendering module 214 may use the object profile data 216 and the character profile data 218 to identify three-dimensional models or other data that may be used to render the scene.

The object profile data 216 may include a library of virtual objects that are each tagged with appropriate activities, themes, and/or other metadata. Additionally, each virtual object within the object profile data 216 may include or reference a three-dimensional model or other data that may be used to render the virtual object. The object profile data 216 may be stored locally on the augmented reality device 102 (e.g., by the data storage device 126), remotely in one or more networked storage locations (e.g., in virtual object data 104), or in any combination of local and remote storage.

Similarly, the character profile data 218 may include a library of characters that are also tagged with appropriate activities, themes, and/or other metadata. Each virtual character within the character profile data 218 may include or reference a three-dimensional model or other data that may be used to render the virtual character. Additionally, each virtual character within the character profile data 218 may reference or otherwise define compatible virtual objects and how they may be applied. For example, the character profile data 218 may indicate that a particular character may have a hat and/or glasses applied. The character profile data 218 may be stored locally on the augmented reality device (e.g., by the data storage device 126), remotely in one or more networked storage locations (e.g., in character data 106), or in any combination of local and remote storage.

Figure 3:
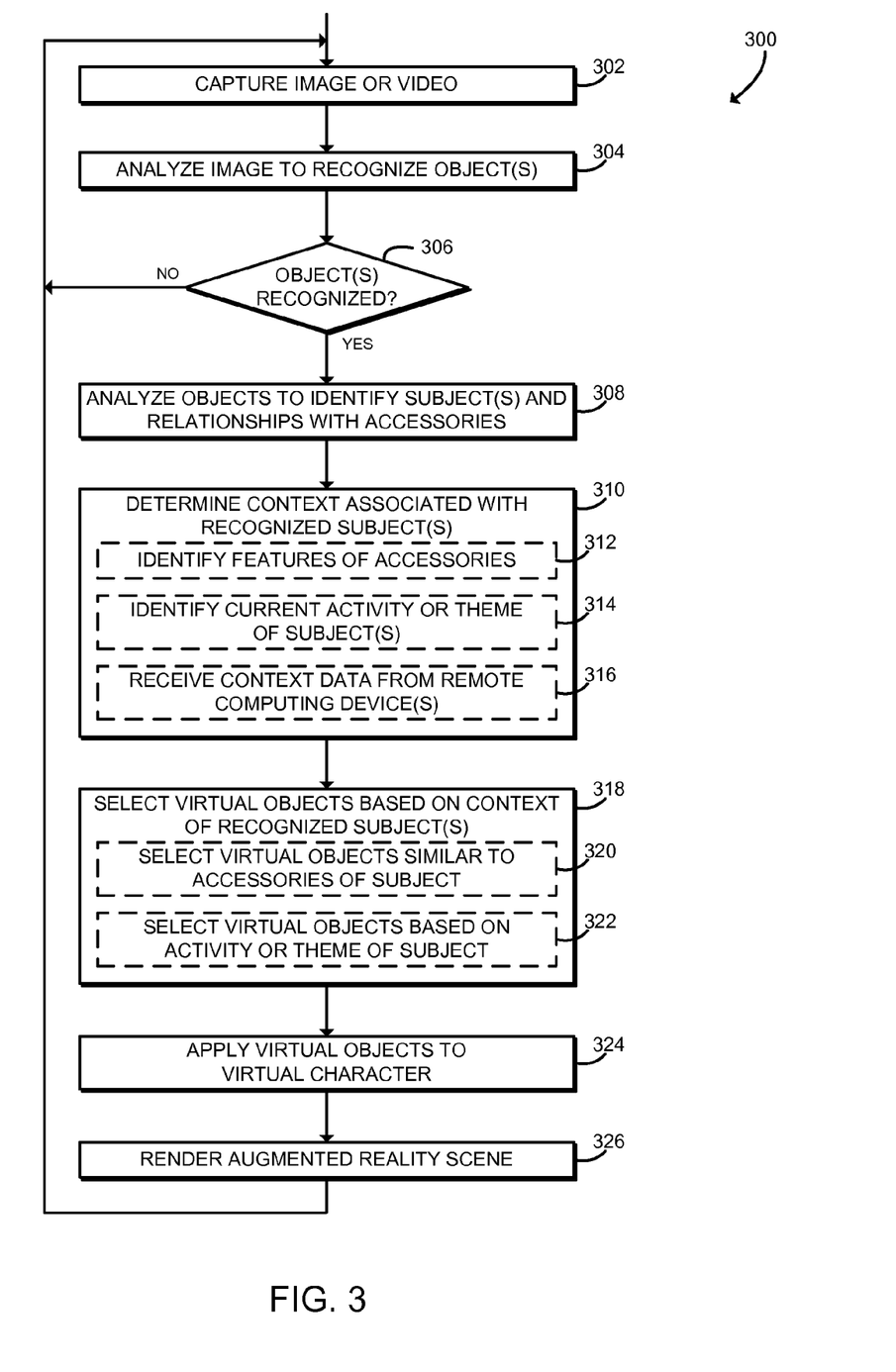
FIG. 3 is a simplified flow diagram of at least one embodiment of a method for rendering augmented reality virtual objects that may be executed by the augmented reality device of the system of FIGS. 1 and 2.

Referring now to FIG. 3, in use, the augmented reality device 102 may execute a method 300 for rendering augmented reality virtual objects. The method 300 begins with block 302, in which the augmented reality device 102 captures a still image or video image using the camera 132. The augmented reality device 102 may initiate image capture in response to input from a user, for example, selection of an image capture command or application. In some embodiments, the augmented reality device 102 may capture a stream of video images to display on the display 130 and then capture a still image in response to a further user input.

After capturing an image, in block 304 the augmented reality device 102 analyzes the image to recognize any objects present in the image. Recognized objects may include persons, faces, clothing or similar accessories, environmental objects, or any other object in the image that may be recognized by the augmented reality device 102. The augmented reality device 102 may perform any process or algorithm for object detection and/or recognition, including facial detection and recognition, object recognition and classification, skeletal tracking, or any other known machine learning technique for detecting, classifying, or identifying objects. In block 306, the augmented reality device 102 determines whether any objects have been recognized in the image. If not, the method 300 loops back to block 302. If one or more subjects have been recognized, the method 300 advances to block 308.

In block 308, the augmented reality device 102 analyzes the recognized objects to identify one or more subjects of the image as well as relationships between the subjects and accessory objects. Subjects of the image may include persons, faces, significant objects, or other prominent features included in the image. Accessories may include clothing, eyewear, tools, background objects, or any other object related to otherwise associated with a recognized subject.

In block 310, the augmented reality device 102 determines a context associated with the recognized subjects. The context may include relationship data, semantic data, or any other metadata associated with the recognized subjects of the captured image. The augmented reality device 102 may determine the context by comparing the recognized subjects to similar objects described by the object profile data 216 and/or the character profile data 218. The context of the recognized subjects may thus correspond to the contextual or other metadata associated with similar objects stored in the object profile data 216 and/or the character profile data 218. Additionally, in some embodiments, the augmented reality device 102 may determine the context based on various sensor data in addition to the captured image. For example, the augmented reality device 102 may determine the context using location data received from location circuitry such as a GPS receiver. In some embodiments, in block 312, the augmented reality device 102 may identify one or more features of the accessory objects included in the image. For example, the augmented reality device may identify features related to the type, style, appearance, or other attributes of the recognized accessories. Those identified features may be matched against the object profile data 216 to find a collection of matching objects. Those matching objects, and the associated metadata contained in the object profile data 216, may describe the context of the recognized subjects.

In some embodiments, in block 314, the augmented reality device 102 may identify a current activity or theme of the recognized subjects. The augmented reality device 102 may identify the current activity based on the features of the recognized subjects, background items, accessories, or other objects recognizable in the image. For example, an image including ocean waves and sand may be identified as a "beach" or "surfing" theme, whereas an image including shelves of books may be identified as a "library" theme. The activity and/or theme may be determined using the object profile data 216 and/or the character profile data 218. For example, one or more objects recognized in the image may be associated with a common activity or theme by the object profile data 216 and/or the character profile data 218. Additionally, in some embodiments the current activity or theme may be determined using additional sensor data such as location data received from a GPS receiver. Continuing the previous example, the augmented reality device 102 may analyze location and/or mapping data to determine that the image was captured near a beach or a library.

In some embodiments, in block 316 the augmented reality device 102 may receive context data from one or more remote mobile computing devices 108. For example, the augmented reality device 102 may receive data concerning a subject's current activity from a mobile computing device 108 associated with that subject. A subject may use a mobile computing device 108 to share contextual data, for example by "opting-in" to share contextual data using a social networking application. That contextual data may be used by the augmented reality device 102 to determine the context of the subject or to supplement a contextual determination made based on the captured image. The augmented reality device 102 may receive that contextual data using any communication method, including wireless transmission, personal-area networking, near-field communication, or any other method of communication. For example, the augmented reality device 102 may poll nearby mobile computing devices 108 using short-range wireless communications to determine if contextual data is available. Of course, to protect privacy, the subject may limit or control access to his or her contextual data.

After determining the context of the subjects, in block 318, the augmented reality device 102 selects one or more virtual objects based on the context of the recognized subjects. The augmented reality device 102 may select virtual objects that imitate the context of the recognized subject using the object profile data 216. In some embodiments, in block 320, the augmented reality device 102 may select one or more virtual objects that are similar to the identified accessories within the image. For example, if the augmented reality device 102 determines that the subject is wearing a hat, the augmented reality device 102 may use the object profile data 216 to select a similar hat (e.g., a hat of similar style or color). In some embodiments, in block 322, the augmented reality device 102 may select one or more virtual objects based on the identified activity or theme of the recognized subjects. For example, consider that the augmented reality device 102 has determined that the subject's current activity is "surfing" or "at the beach." The augmented reality device 102 may use the object profile data 216 to select virtual objects associated with that activity, for example a surfboard. As another example, consider that the augmented reality device 102 has determined that the subject's theme is "library." In that example, the augmented reality device 102 may select virtual objects associated with a library theme such as reading glasses or a book.

In block 324, the augmented reality device 102 applies the selected virtual objects to one or more virtual characters. The virtual characters may be selected using the character profile data 218. The augmented reality device 102 may apply the virtual objects by adding an accessory object to the virtual character, modifying characteristics of the virtual character, or using any other appropriate technique. For example, consider that the virtual character is described by one or more three-dimensional models. The augmented reality device 102 may load and prepare an additional three-dimensional model for the selected virtual object and combine that three-dimensional model with the model of the virtual character. Three-dimensional model data for the virtual object may be stored or referenced by the object profile data 216, and may originate from a different source than the source of the virtual character model. For example, the augmented reality device 102 may download three-dimensional model data for the virtual object from a third-party server. As another example, the augmented reality device 102 may modify the three-dimensional model of the character based on the selected virtual objects to be applied.

In block 326, the augmented reality device 102 renders an augmented reality scene. The augmented reality scene is based on the original image captured by the camera 132, and includes a rendering of the virtual character and any selected virtual objects that have been applied to the virtual character. The augmented reality device 102 may render the augmented reality scene by displaying images, video, rendered computer graphics, text, or other visual information on the display 130, by storing information using the data storage device 126, by projecting content into the device environment, or by otherwise presenting the augmented reality scene in a format usable by the user. For example, the augmented reality device 102 may render the augmented reality scene by inserting a graphical depiction of the virtual character into the captured image and displaying the resulting image on the display 130. After rendering the augmented reality scene, the method 300 loops back to block 302 to continue capturing images.

Although illustrated as selecting a virtual object to apply to the virtual character, it should be understood that in some embodiments the augmented reality device 102 may select a virtual object to apply to the recognized subjects. In those embodiments (not shown), in block 310, the augmented reality device 102 may determine a context associated with the virtual character rather than the recognized subjects. For example, the augmented reality device 102 may determine an activity or theme typically associated with a particular virtual character (e.g., surfing, reading books, etc.) based on the character profile data 218. In those embodiments, in block 318, the augmented reality device 102 may select virtual objects based on the context of the virtual character, and in block 324 the augmented reality device 102 may apply the selected virtual objects to the recognized subjects. For example, the augmented reality device 102 may render accessories for each recognized subject that are similar to accessories of the virtual character or are related to the typical theme or activity of the virtual character. Continuing that example, for a virtual character associated with surfing, the augmented reality device 102 may render each subject with a virtual surfboard. As another example, the augmented reality device 102 may render virtual hats, eyeware, costumes, or other accessories on each subject that are similar to the accessories of the virtual character.

Figure 4:
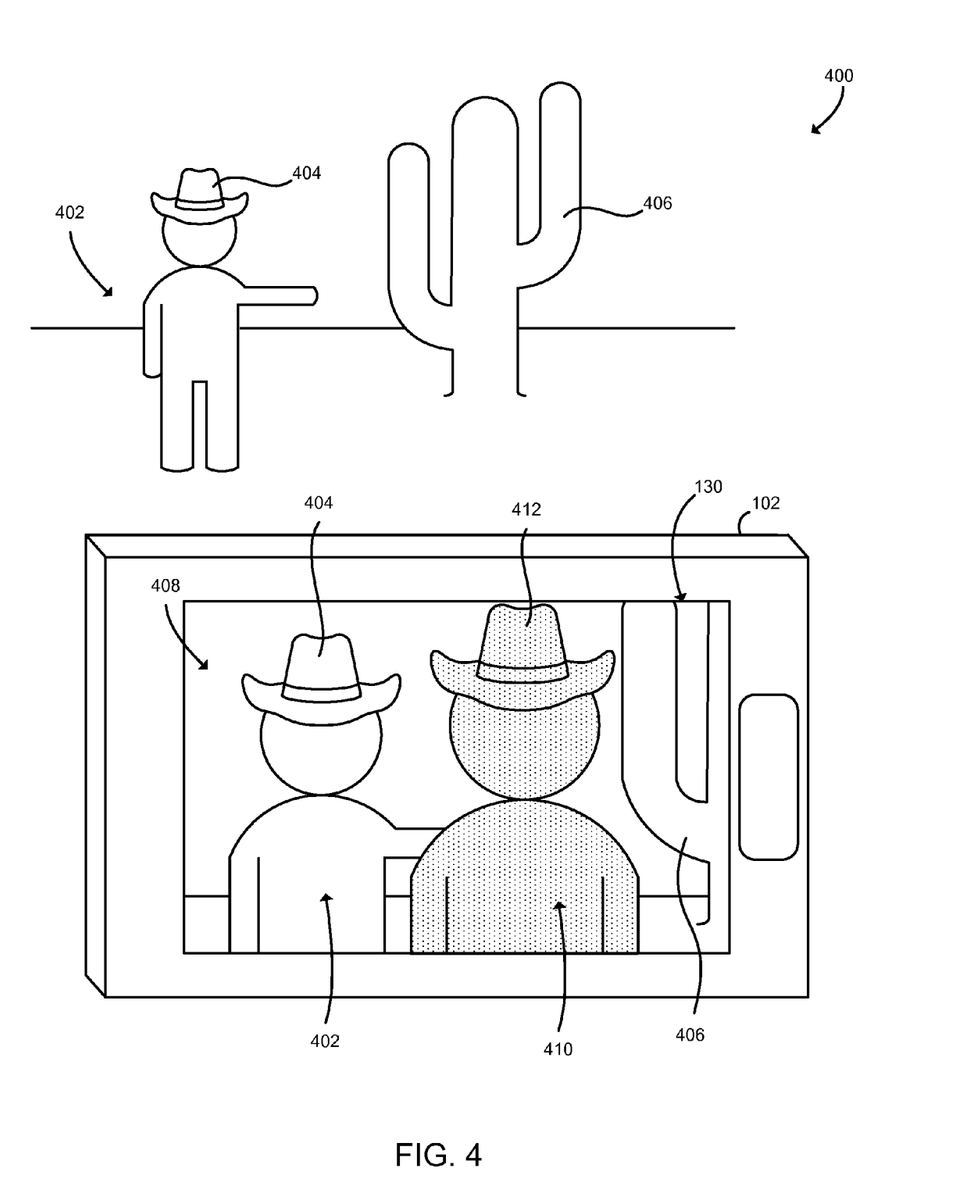
FIG. 4 is a schematic diagram illustrating an augmented reality scene that may be rendered by the augmented reality device of FIGS. 1 and 2.

Referring now to FIG. 4, diagram 400 illustrates one embodiment of an augmented reality device 102 rendering an augmented reality scene. In the illustrative embodiment, a person 402 is posing for a photograph in a desert environment. The person 402 is shown wearing a cowboy hat 404 and standing in front of a cactus 406. The augmented reality device 102 is illustrated as a smartphone that is photographing the person 402, cowboy hat 404, and cactus 406.

In the illustrative embodiment, the augmented reality device 102 may identify the person 402, hat 404, and cactus 406 as objects within the captured image. The augmented reality device 102 may identify the person 402 as the subject of the image. The augmented reality device 102 may further recognize that the cowboy hat 404 is an accessory of the subject 402, and that the cactus 406 is a background or environmental object associated with the subject 402. Based on those recognized objects and/or relationships, the augmented reality device 102 may identify the context of the subject 402 as having an activity or theme of "desert," "western," or "cowboy." Of course, those themes are merely illustrative, and in other embodiments any theme may be used. The particular activity or theme recognized may depend on the available themes in the object profile data 216 and/or the character profile data 218.

The augmented reality device 102 is illustrated as rendering an augmented reality scene 408 on the display 130. The augmented reality scene includes the subject 402, the cowboy hat 404, and the cactus 406. The augmented reality scene further includes a virtual character 410. The virtual character 410 may be selected using the character profile data 218 and may be embodied as a cartoon character, movie or television character, celebrity, or other appropriate figure. The virtual character 410 is illustrated as wearing a virtual cowboy hat 412. The illustrative virtual cowboy hat 412 is a virtual object selected using the object profile data 216 and not a predefined feature of the virtual character 410. For example, virtual character 410 may be a superhero character who typically does not wear a hat at all. The augmented reality device 102 may have selected the virtual cowboy hat 412 based on its similarity to the features of the cowboy hat 404 worn by the subject 402. Additionally or alternatively, the augmented reality device 102 may have selected the virtual cowboy hat 412 based on its relation to the identified activity or theme of the subject 402. For example, the augmented reality device 102 may have selected the virtual cowboy hat 412 as being appropriate for a "western" or "cowboy" theme, based on the object profile data 216.

As another example, consider that the subject 402 is not wearing the cowboy hat 404, and that the virtual character 410 is predefined to include the virtual cowboy hat 412. In that example, the augmented reality device 102 may identify the theme or activity of the virtual character 410 as "western" or "cowboy" based on the character profile data 218 and/or the object profile data 216. Based on the identified activity or theme, the augmented reality device 102 may select a virtual cowboy hat 404 using the object profile data 216 based on its relationship to that theme, and may render the virtual cowboy hat 404 on the subject 402 in the augmented reality scene 408.

EXAMPLES

Illustrative examples of the technologies disclosed herein are provided below. An embodiment of the technologies may include any one or more, and any combination of, the examples described below.

Example 1 includes an augmented reality device for rendering augmented reality content, the augmented reality device comprising an image capture module to capture an image; a subject recognition module to (i) analyze the image to recognize a subject represented in the image and (ii) determine a context associated with the subject based on the image; a virtual object matching module to select a virtual object based on the context of the subject; and an augmented reality rendering module to (i) apply the virtual object to a virtual character and (ii) render an augmented reality scene based on the captured image and including the virtual character with the virtual object applied thereto.

Example 2 includes the subject matter of Example 1, and wherein the subject comprises a person or an object.

Example 3 includes the subject matter of any of Examples 1 and 2, and wherein the virtual object comprises an accessory object that is composable with the virtual character.

Example 4 includes the subject matter of any of Examples 1-3, and wherein to determine the context comprises to identify an accessory object represented in the image that is related to the subject.

Example 5 includes the subject matter of any of Examples 1-4, and wherein to select the virtual object comprises to select a virtual object similar to the accessory object.

Example 6 includes the subject matter of any of Examples 1-5, and wherein to determine the context comprises to identify a feature of the accessory object; and to select the virtual object similar to the accessory object comprises to select a virtual object having a feature matching the feature of the accessory object.

Example 7 includes the subject matter of any of Examples 1-6, and wherein the context comprises a current activity of the subject.

Example 8 includes the subject matter of any of Examples 1-7, and wherein selecting the virtual object comprises selecting a virtual object associated with the current activity of the subject.

Example 9 includes the subject matter of any of Examples 1-8, and wherein the context comprises a theme associated with the subject.

Example 10 includes the subject matter of any of Examples 1-9, and wherein to select the virtual object comprises to select a virtual object associated with the theme associated with the subject.

Example 11 includes the subject matter of any of Examples 1-10, and wherein the image comprises a still image or a video image.

Example 12 includes the subject matter of any of Examples 1-11, and wherein to determine the context comprises to receive context data from a mobile computing device associated with the subject.

Example 13 includes the subject matter of any of Examples 1-12, and wherein to select the virtual object comprises to receive the virtual object from a remote virtual object database.

Example 14 includes a method for rendering augmented reality content, the method comprising capturing, by an augmented reality device, an image; analyzing, by the augmented reality device, the image to recognize a subject represented in the image; determining, by the augmented reality device, a context associated with the subject based on the image; selecting, by the augmented reality device, a virtual object based on the context of the subject; applying, by the augmented reality device, the virtual object to a virtual character; and rendering, by the augmented reality device, an augmented reality scene based on the captured image and including the virtual character with the virtual object applied thereto.

Example 15 includes the subject matter of Example 14, and wherein analyzing the image to recognize the subject comprises analyzing the image to recognize a person or an object.

Example 16 includes the subject matter of any of Examples 14 and 15, and wherein selecting the virtual object comprises selecting an accessory object that is composable with the virtual character.

Example 17 includes the subject matter of any of Examples 14-16, and wherein determining the context comprises identifying an accessory object represented in the image that is related to the subject.

Example 18 includes the subject matter of any of Examples 14-17, and wherein selecting the virtual object comprises selecting a virtual object similar to the accessory object.

Example 19 includes the subject matter of any of Examples 14-18, and wherein determining the context comprises identifying a feature of the accessory object; and selecting the virtual object similar to the accessory object comprises selecting a virtual object having a feature matching the feature of the accessory object.

Example 20 includes the subject matter of any of Examples 14-19, and wherein determining the context comprises determining a current activity of the subject.

Example 21 includes the subject matter of any of Examples 14-20, and wherein selecting the virtual object comprises selecting a virtual object associated with the current activity of the subject.

Example 22 includes the subject matter of any of Examples 14-21, and wherein determining the context comprises determining a theme associated with the subject.

Example 23 includes the subject matter of any of Examples 14-22, and wherein selecting the virtual object comprises selecting a virtual object associated with the theme associated with the subject.

Example 24 includes the subject matter of any of Examples 14-23, and wherein capturing the image comprises capturing a still image or a video image.

Example 25 includes the subject matter of any of Examples 14-24, and wherein determining the context comprises receiving context data from a mobile computing device associated with the subject.

Example 26 includes the subject matter of any of Examples 14-25, and wherein selecting the virtual object comprises receiving the virtual object from a remote virtual object database.

Example 27 includes a computing device comprising a processor; and a memory having stored therein a plurality of instructions that when executed by the processor cause the computing device to perform the method of any of Examples 14-26.

Example 28 includes one or more machine readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a augmented reality device for rendering augmented reality content, the augmented reality device comprising means for capturing an image; means for analyzing the image to recognize a subject represented in the image; means for determining a context associated with the subject based on the image; means for selecting a virtual object based on the context of the subject; means for applying the virtual object to a virtual character; and means for rendering an augmented reality scene based on the captured image and including the virtual character with the virtual object applied thereto.

Example 31 includes the subject matter of Example 30, and wherein the means for analyzing the image to recognize the subject comprises means for analyzing the image to recognize a person or an object.

Example 32 includes the subject matter of any of Examples 30 and 31, and wherein the means for selecting the virtual object comprises means for selecting an accessory object that is composable with the virtual character.

Example 33 includes the subject matter of any of Examples 30-32, and wherein the means for determining the context comprises means for identifying an accessory object represented in the image that is related to the subject.

Example 34 includes the subject matter of any of Examples 30-33, and wherein the means for selecting the virtual object comprises means for selecting a virtual object similar to the accessory object.

Example 35 includes the subject matter of any of Examples 30-34, and wherein the means for determining the context comprises means for identifying a feature of the accessory object; and the means for selecting the virtual object similar to the accessory object comprises means for selecting a virtual object having a feature matching the feature of the accessory object.

Example 36 includes the subject matter of any of Examples 30-35, and wherein the means for determining the context comprises means for determining a current activity of the subject.

Example 37 includes the subject matter of any of Examples 30-36, and wherein the means for selecting the virtual object comprises means for selecting a virtual object associated with the current activity of the subject.

Example 38 includes the subject matter of any of Examples 30-37, and wherein the means for determining the context comprises means for determining a theme associated with the subject.

Example 39 includes the subject matter of any of Examples 30-38, and wherein the means for selecting the virtual object comprises means for selecting a virtual object associated with the theme associated with the subject.

Example 40 includes the subject matter of any of Examples 30-39, and wherein the means for capturing the image comprises means for capturing a still image or a video image.

Example 41 includes the subject matter of any of Examples 30-40, and wherein the means for determining the context comprises means for receiving context data from a mobile computing device associated with the subject.

Example 42 includes the subject matter of any of Examples 30-41, and wherein the means for selecting the virtual object comprises means for receiving the virtual object from a remote virtual object database.

The invention claimed is:

1. An augmented reality device for rendering augmented reality content, the augmented reality device comprising:
   image capture circuitry to capture an image;
   subject recognition circuitry to (i) analyze the image to recognize a subject represented in the image and a background item in the image, (ii) access a character profile based on the subject, (iii) determine, based on the character profile, whether the background item is associated with the subject, (iv) determine, based on the character profile and in response to a determination that the background item is associated with the subject, a theme of the image, and (v) determine a context associated with the subject based on the image and the background item, wherein the context is related to the theme, wherein to determine the context comprises to classify a type of an accessory object represented in the image that is related to the subject;

virtual object matching circuitry to select a virtual object based on the context of the subject and the background item, wherein the virtual object comprises an accessory object that is composable with the virtual character and is of the same type as the accessory object represented in the image, and wherein to select the virtual object comprises to select the virtual object based on similarity between the virtual object and a feature of the subject; and augmented reality rendering circuitry to (i) apply the virtual object to a virtual character and (ii) render an augmented reality scene based on the captured image and including the virtual character with the virtual object applied thereto.

2. The augmented reality device of claim 1, wherein to select the virtual object comprises to select a virtual object similar to the accessory object.

3. The augmented reality device of claim 2, wherein:
to determine the context comprises to identify a feature of the accessory object; and
to select the virtual object similar to the accessory object comprises to select a virtual object having a feature matching the feature of the accessory object.

4. The augmented reality device of claim 1, wherein the context comprises a current activity of the subject.

5. The augmented reality device of claim 4, wherein to select the virtual object comprises to select a virtual object associated with the current activity of the subject.

6. The augmented reality device of claim 1, wherein to select the virtual object comprises to select a virtual object associated with the theme associated with the subject.

7. The augmented reality device of claim 1, wherein to determine the context comprises to receive context data from a mobile computing device associated with the subject.

8. The augmented reality device of claim 7, wherein the subject recognition circuitry is further to receive an indication from the mobile computing device that the user of the mobile computing device has opted-in to share the context data.

9. The augmented reality device of claim 7, wherein to receive the context data from the mobile computing device comprises to:
poll the mobile computing device to determine whether the mobile computing device has the context data available;
receive, in response to the poll of the mobile computing device, an indication from the mobile computing device that the context data is available;
request the context data from the mobile computing device in response to the indication that the context data is available; and
receive, in response to the request, the context data from the mobile computing device.

10. The augmented reality device of claim 1, wherein to select the virtual object comprises to receive the virtual object from a remote virtual object database.

11. A method for rendering augmented reality content, the method comprising:
capturing, by an augmented reality device, an image;
analyzing, by the augmented reality device, the image to recognize a subject represented in the image and a background item in the image;
accessing, by the augmented reality device, a character profile based on the subject;
determining, by the augmented reality device and based on the character profile, whether the background item is associated with the subject;
determine, by the augmented reality device and in response to a determination that the background item is associated with the subject, a theme of the image based on the character profile;
determining, by the augmented reality device, a context associated with the subject based on the image and the background item, wherein the context is related to the theme, wherein determining the context comprises classifying a type of an accessory object represented in the image that is related to the subject;
selecting, by the augmented reality device, a virtual object based on the context of the subject and the background item, wherein the virtual object comprises an accessory object that is composable with the virtual character and is of the same type as the accessory object represented in the image, and wherein selecting the virtual object comprises selecting the virtual object based on similarity between the virtual object and a feature of the subject;
applying, by the augmented reality device, the virtual object to a virtual character; and
rendering, by the augmented reality device, an augmented reality scene based on the captured image and including the virtual character with the virtual object applied thereto.

12. The method of claim 11, wherein determining the context comprises determining a current activity of the subject.

13. One or more non-transitory computer-readable storage media comprising a plurality of instructions that in response to being executed cause an augmented reality device to:
capture an image;
analyze the image to recognize a subject represented in the image and a background item in the image;
access a character profile based on the subject;
determine, based on the character profile, whether the background item is associated with the subject;
determine, based on the character profile and in response to a determination that the background item is associated with the subject, a theme of the image;
determine a context associated with the subject based on the image and the background item, wherein the context is related to the theme, wherein to determine the context comprises to classify a type of an accessory object represented in the image that is related to the subject;
select a virtual object based on the context of the subject and the background item, wherein the virtual object comprises an accessory object that is composable with the virtual character and is of the same type as the accessory object represented in the image, and wherein to select the virtual object comprises to select the virtual object based on similarity between the virtual object and a feature of the subject;
apply the virtual object to a virtual character; and
render an augmented reality scene based on the captured image and including the virtual character with the virtual object applied thereto.

14. The one or more non-transitory computer-readable storage media of claim 13, wherein to select the virtual object comprises to select a virtual object similar to the accessory object.

15. The one or more non-transitory computer-readable storage media of claim 14, wherein:
- to determine the context comprises to identify a feature of the accessory object; and
- to select the virtual object similar to the accessory object comprises to select a virtual object having a feature matching the feature of the accessory object.

16. The one or more non-transitory computer-readable storage media of claim 13, wherein to determine the context comprises to determine a current activity of the subject.

17. The one or more non-transitory computer-readable storage media of claim 16, wherein to select the virtual object comprises to select a virtual object associated with the current activity of the subject.

18. The one or more non-transitory computer-readable storage media of claim 13, wherein to select the virtual object comprises to select a virtual object associated with the theme associated with the subject.

* * * * *